(12) United States Patent
Lee et al.

(10) Patent No.: US 7,474,931 B2
(45) Date of Patent: Jan. 6, 2009

(54) SOUND FAST-FORWARD METHOD AND DEVICE

(75) Inventors: Richard Lee, Shindian (TW); Kidd Lee, Shindian (TW)

(73) Assignee: VIA Technologies, Inc., Shindian, Taipei (TW)

( * ) Notice: Subject to any disclaimer, the term of this patent is extended or adjusted under 35 U.S.C. 154(b) by 848 days.

(21) Appl. No.: 10/967,154

(22) Filed: Oct. 19, 2004

(65) Prior Publication Data

US 2006/0028937 A1 Feb. 9, 2006

(30) Foreign Application Priority Data

Aug. 4, 2004 (TW) .............. 93123285 A

(51) Int. Cl.
*G06F 17/00* (2006.01)

(52) U.S. Cl. .......................... 700/94; 386/68

(58) Field of Classification Search ........... None
See application file for complete search history.

(56) References Cited

U.S. PATENT DOCUMENTS 6,026,067 A * 2/2000 Tanaka .................. 369/47.18

6,226,608 B1 * 5/2001 Fielder et al. ............... 704/229

OTHER PUBLICATIONS

Richard G. Lyons, Understanding Digital Signal Processing 84 (2001).*

Alan V. Oppenheim et al., Discrete-Time Signal Processing 471 (Alan V. Oppenheim ed.) (1999).*

* cited by examiner

*Primary Examiner*—Walter F Briney, III
(74) *Attorney, Agent, or Firm*—Bacon & Thomas, PLLC

(57) ABSTRACT

A sound fast-forward method and device. The method comprises a sound-data classifying process, a play-data transforming process, and a gain treating process. The sound-data classifying process classifies an inputted sound data into at least one first play data and at least one skip data. The play-data transforming process multiplies the first play data with a windowing function to generate a second play data. The gain treating process multiplies the first play data with a first gain to generate a first gain play data, multiplies the second play data with a second gain to generate a second gain play data, and adds the first gain play data and the second gain play data to generate a fast-forward data.

10 Claims, 5 Drawing Sheets

SOUND FAST-FORWARD METHOD AND DEVICE

BACKGROUND OF THE INVENTION

1. Field of Invention

The invention relates to a sound fast-forward playing method and device, and, in particular, to a sound fast-forward playing method and device, which is used for an audio decoding system.

2. Related Art

The fast-forward playing, such as double speed or high speed fast-forward playing, is a convenient function for a user to search the desired music section or content. If the multi-channel (AC3, DTS, MPEG MultiCH, MLP) or two-channel (CDDA, MP3, MPEG) audio decoding system plays a fast-forward, the following four methods may be concerned. The first method is to increase sampling frequency so as to decode all data and to play it. In this case, the digital/analog converter (DAC) should be adjusted higher, which results in the key increase and generates grating sound. The second method is to increase sampling frequency so as to decode all data and then to lower the key with down sampling technology, so that the user would not hear the voice with risen key. The third method is to play skipped data, so it is unnecessary to adjust the DAC. The fourth method is to play a mute mode.

In the previously mentioned first and second methods, since the processor, such as CPU or DSP, has limitation on calculating speed, it may fail to exactly match the sound sampling frequency increased for the continuously fast-forward play. Furthermore, the performance of the hardware may be greatly decreased. In the two-channel or multi-channel audio decoding system, the performance of hardware is a very important resource. For example, the performance of hardware is 50 MIPS for DTS 5.1 surround decoding, and is more than 65 MIPS for MLP decoding. In double speed or high speed fast-forward playing, the required value of MIPS is doubled. If the calculating speed of processor cannot match the sound sampling frequency increased for the continuously fast-forward play, the conventional DVD player may play mute mode or play skipped data. However, when the DVD player plays skipped data for fast-forward playing, since some sound data are skipped, the broken noise due to the discontinuous point of sound wave may occur. This will affect the user while determining the content of the played sound, and, also, the broken noise is grating.

It is therefore an important objective of the invention to provide a sound fast-forward method without occupying much hardware performance and to make the sound wave more continuous for preventing broken noise.

SUMMARY OF THE INVENTION

In view of the foregoing, the invention is to provide a sound fast-forward method and device, which do not occupy much hardware performance and can make the sound wave more continuous for preventing broken noise.

To achieve the above, a sound fast-forward method of the invention comprises a sound-data classifying process, which classifies an inputted sound data into at least one first play data and at least one skip data; a play-data transforming process, which multiplies the first play data with a windowing function to generate a second play data; and a gain treating process, which multiplies the first play data with a first gain to generate a first gain play data, multiplies the second play data with a second gain to generate a second gain play data, and adds the first gain play data and the second gain play data to generate a fast-forward data.

In addition, the invention discloses a sound fast-forward device, comprising a sound-data classifying module, which classifies an inputted sound data into at least one first play data and at least one skip data; a play-data transforming module, which multiplies the first play data with a windowing function to generate a second play data; and a gain treating module, which multiplies the first play data with a first gain to generate a first gain play data, multiplies the second play data with a second gain to generate a second gain play data, and adds the first gain play data and the second gain play data to generate a fast-forward data.

The invention further discloses a DVD playing system with a function of decreasing a broken noise in a fast-forward playing, comprising a sound-data classifying module, which classifies an inputted sound data into at least one first play data and at least one skip data in the fast-forward playing, wherein the sound data is a two-channel sound data or a multi-channel sound data; a play-data transforming module, which multiplies the first play data with a windowing function to generate a second play data; a gain treating module, which multiplies the first play data with a first gain to generate a first gain play data, multiplies the second play data with a second gain to generate a second gain play data, and adds the first gain play data and the second gain play data to generate a fast-forward data; and a user interface, which is for a user to choose the fast-forward playing.

As mentioned above, since the first play data is multiplied with a windowing function and a gain treating process is applied to modify the required play data, the processor (such as CPU or DSP) is not necessary to decode all data. As a result, the hardware performance would not be mostly occupied, and the sound wave could become more continuous for preventing broken noise.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
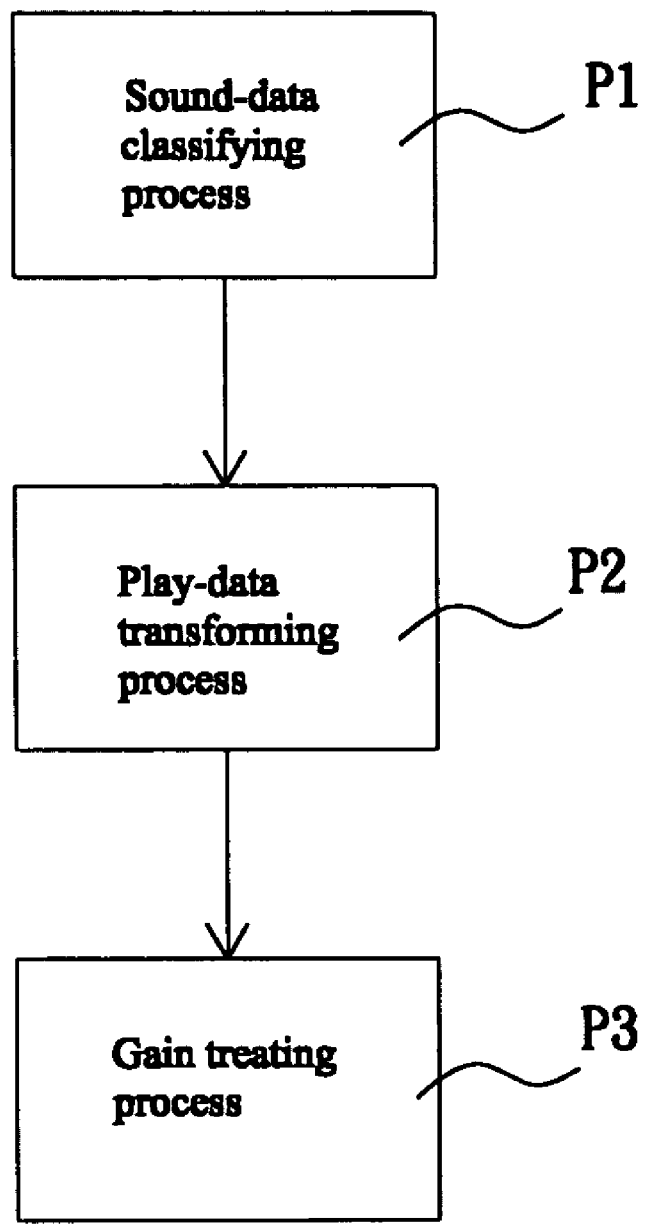
FIG. 1 is a flow chart showing a sound fast-forward playing method according to a preferred embodiment of the invention.
Figure 2A:
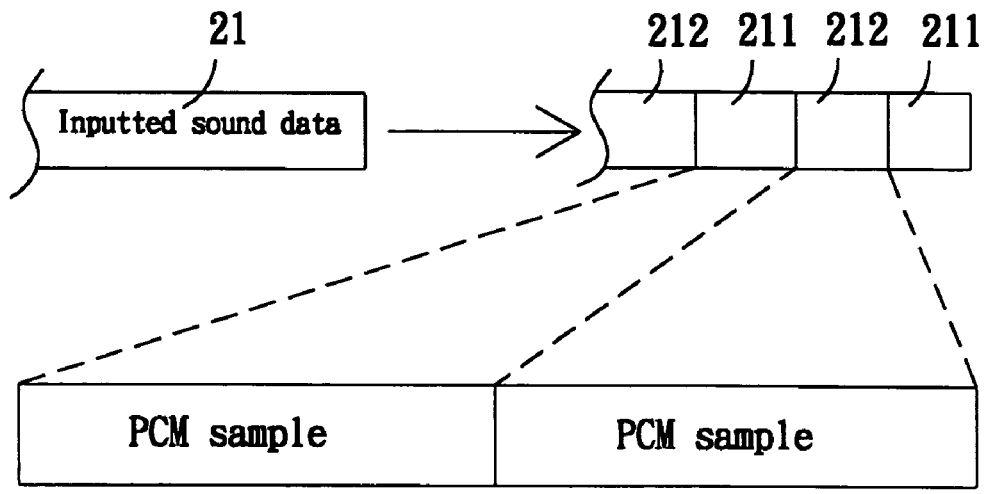
FIGS. 2A to 2D are schematic illustrations showing the steps of the sound fast-forward playing method according to the preferred embodiment of the invention.

With reference to FIG. 1, a sound fast-forward playing method according to a preferred embodiment of the invention comprises a sound-data classifying process P1, a play-data transforming process P2, and a gain treating process P3. In the sound-data classifying process P1, an inputted sound data 21 is classified into at least one first play data 211 and at least one skip data 212 as shown in FIG. 2A. In the embodiment, the inputted sound data 21 can be a two-channel sound data or a multi-channel sound data. As shown in FIG. 2A, the two-channel sound data (e.g. CDDA two-channel sound data) are classified into the first play data 211 and the skip data 212 according to the sound-data classifying process P1. Herein, the first play data 211 and the skip data 212 include several PCM samples. If the first play data 211 are too small during sound fast-forward playing, the risen key occurs. In the current embodiment, the first play data 211 comprises 8192 PCM samples.

Figure 2B:
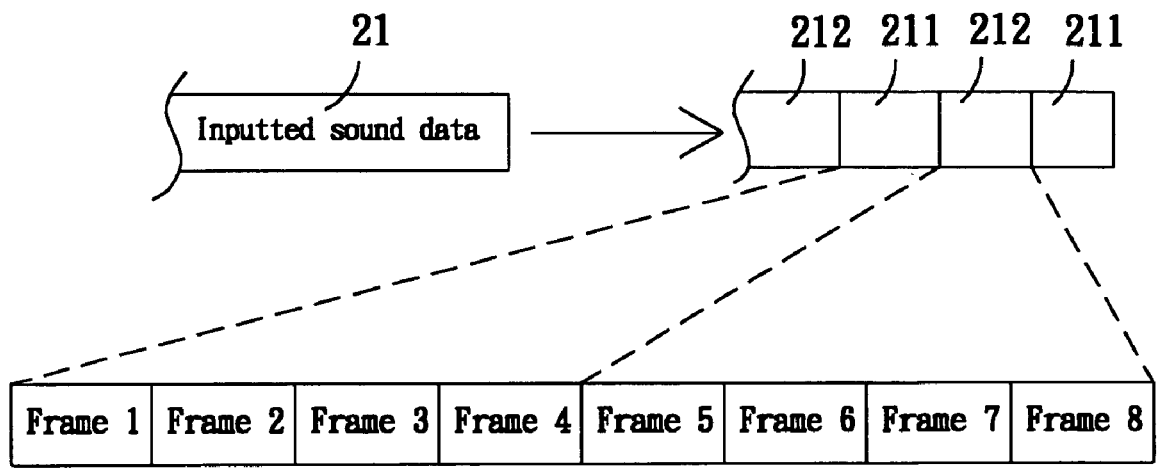

Referring to FIG. 2B, the multi-channel sound data are also classified into the first play data 211 and the skip data 212 according to the sound-data classifying process P1. Herein, the first play data 211 and the skip data 212 include several frames. In the present embodiment, the first play data 211 comprises 4 frames.

Figure 2C:
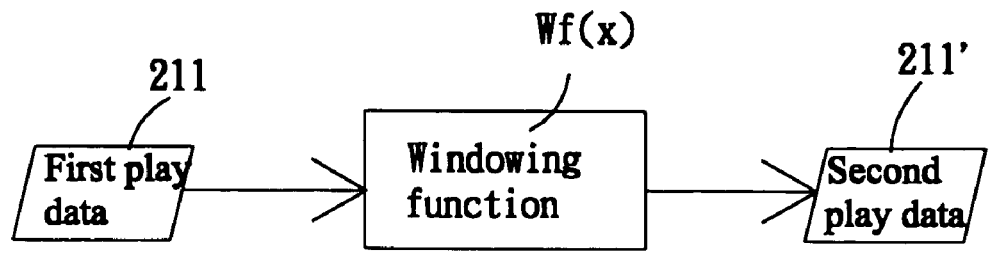

In the play-data transforming process P2, the first play data 211 is multiplied with a windowing function Wf(x), so the first play data 211 is transformed into a second play data 211' (as shown in FIG. 2C). The windowing function Wf(x) can be a Hanning windowing function, Hamming windowing function, or Blackman windowing function. The equation of Hanning windowing function is $Wf(x)=\cos^2(\pi x/2)$, the equation of Hamming windowing function is $Wf(x)=0.54+0.46 \cos(\pi x)$, and the equation of Blackman windowing function is $Wf(x)=0.42+0.5 \cos(\pi x)+0.08 \cos(2\pi x)$, wherein the variable x is the first play data 211. In the current embodiment, the windowing function Wf(x) is a Hanning windowing function.

Figure 2D:
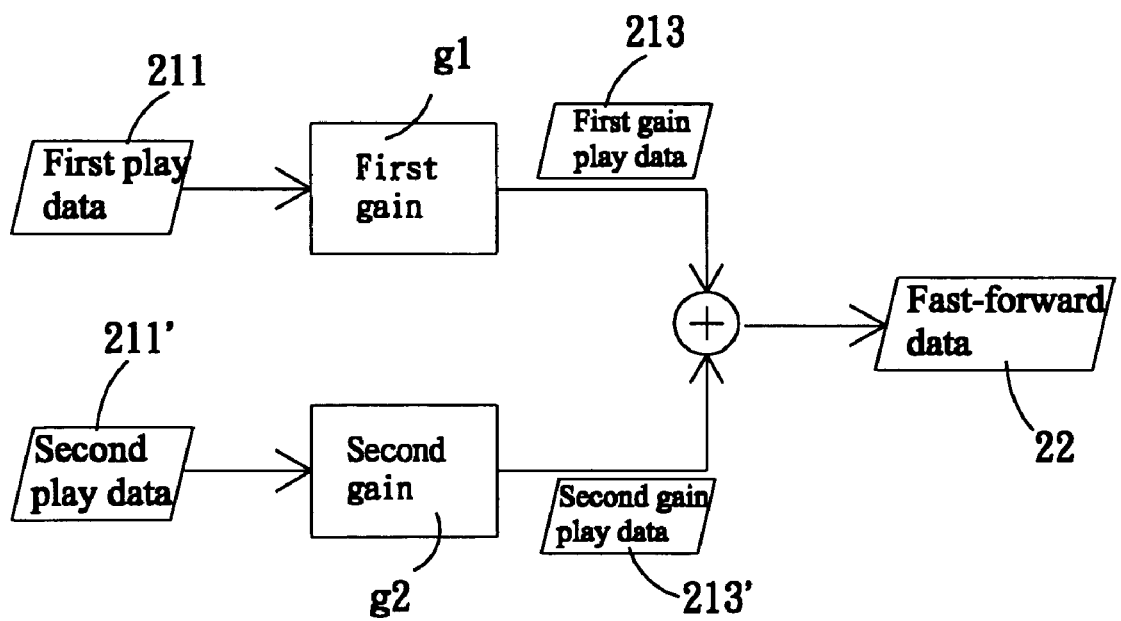

In the gain treating process P3, the first play data 211 is multiplied with a first gain g1 to obtain a first gain play data 213, and the second play data 211' is multiplied with a second gain g2 to obtain a second gain play data 213'. After that, the gain treating process P3 adds the first gain play data 213 and the second gain play data 213' to generate a fast-forward data 22 (as shown in FIG. 2D). In this case, the first gain g1 is smaller than the second gain g2, and the sum of the first gain g1 and the second gain g2 is less than or equal to 1.

Figure 3A:
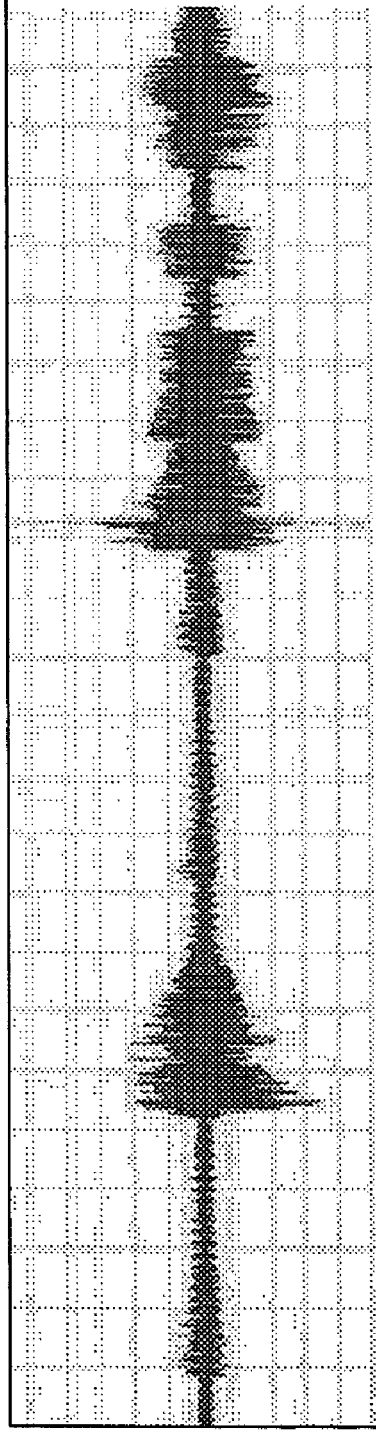
FIGS. 3A to 3C are schematic illustrations showing sound data.
Figure 3B:
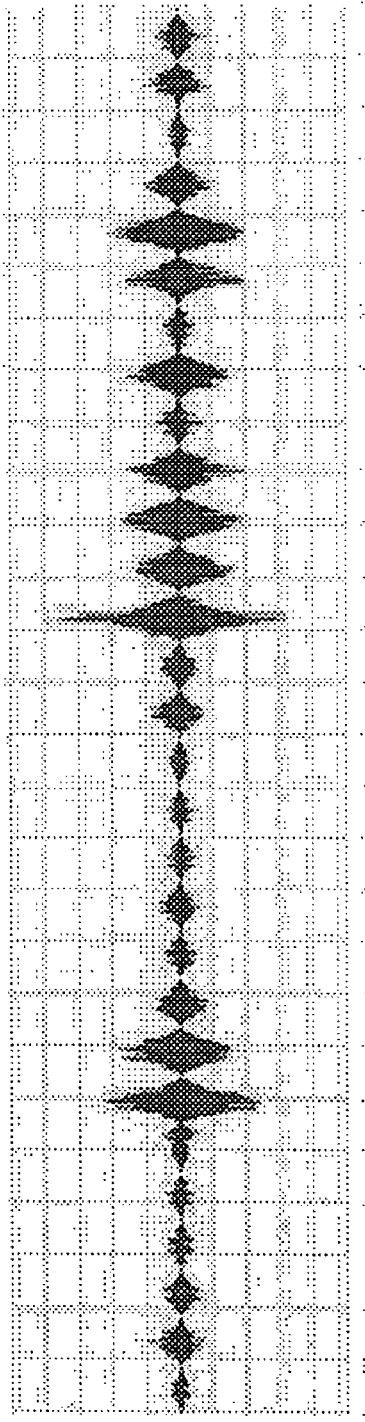
Figure 3C:
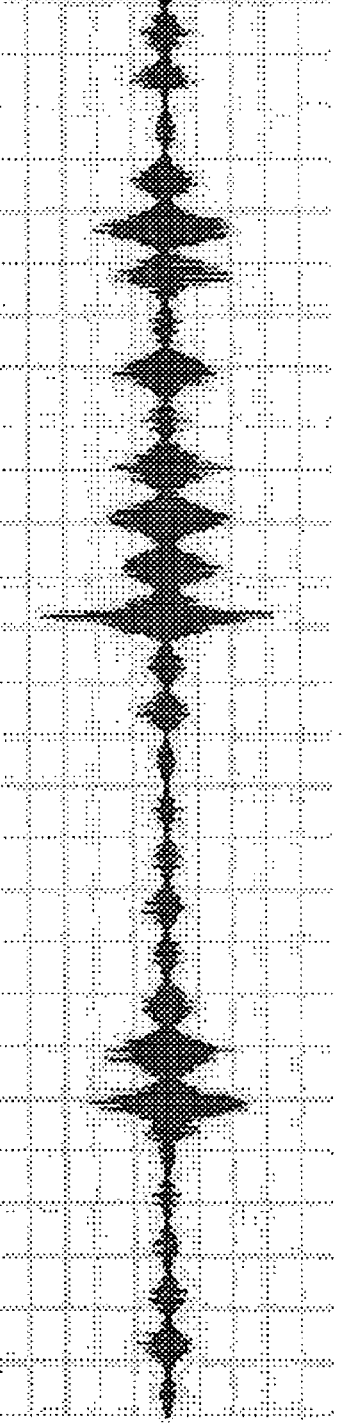

In the embodiment, if only the sound-data classifying process P1 is performed, the result is as shown in FIG. 3A. In this case, hence the inputted sound data 21 is classified into the first play data 211 and the skip data 212 and only the first play data 211 is outputted, it is difficult for a user to understand the content of the outputted grating sound. If the play-data transforming process P2 is then performed, the result is as shown in FIG. 3B. After transforming the first play data 211 based on the windowing function Wf(x), the user can understand the content of the outputted grating sound easier. However, due to the feature of the windowing function Wf(x), the joints of the sound data may be presented as nothing. Finally, if the gain treating process P3 is performed, the result is as shown in FIG. 3C. Due to the modification of the gain treating, the joints of the sound data can be modified smoother. Therefore, the user can clearly understand the content of the sound, and would not feel uncomfortable. In this case as shown in FIG. 3C, the first gain 241 is 0.2, and the second gain 242 is 0.8.

Figure 4:
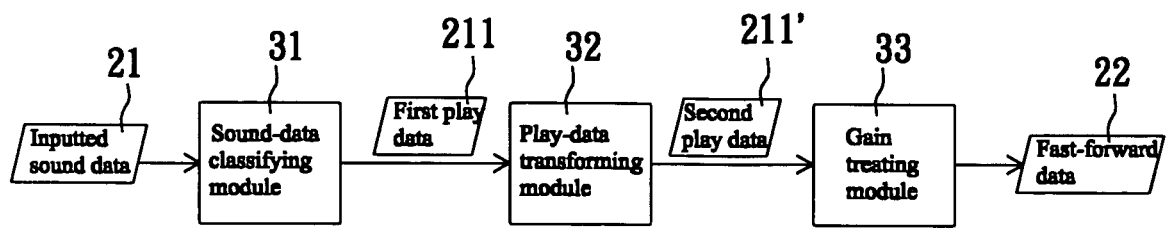
FIG. 4 is a schematic illustration showing a sound fast-forward playing device according to a preferred embodiment of the invention.

FIG. 4 shows a sound fast-forward playing device according to a preferred embodiment of the invention. The sound fast-forward playing device includes a sound-data classifying module 31, a play-data transforming module 32, and a gain treating module 33. In the present embodiment, the sound-data classifying module 31 classifies an inputted sound data 21 into at least one first play data 211 and at least one skip data 212, wherein the inputted sound data 21 can be a two-channel sound data or a multi-channel sound data (as shown in FIG. 2A and FIG. 2B).

The play-data transforming module 32 multiplies the first play data 211 with a windowing function Wf(x), so the first play data 211 is transformed into a second play data 211' (as shown in FIG. 2C). The windowing function Wf(x) can be a Hanning windowing function, Hamming windowing function, or Blackman windowing function. The equation of Hanning windowing function is $Wf(x)=\cos^2(\pi x/2)$, the equation of Hamming windowing function is $Wf(x)=0.54+0.46 \cos(\pi x)$, and the equation of Blackman windowing function is $Wf(x)=0.42+0.5 \cos(\pi x)+0.08 \cos(2\pi x)$, wherein the variable x is the first play data 211. In the current embodiment, the windowing function Wf(x) is a Hanning windowing function.

The gain treating module 33 multiplies the first play data 211 with a first gain g1 to obtain a first gain play data 213, multiplies the second play data 211' with a second gain g2 to obtain a second gain play data 213, and then adds the first gain play data 213 and the second gain play data 213' to generate a fast-forward data 22 (as shown in FIG. 2D). In this case, the first gain g1 is smaller than the second gain g2, and the sum of the first gain g1 and the second gain g2 is less than or equal to 1. In the embodiment, the first gain 241 is 0.2 and the second gain 242 is 0.8.

Figure 5:
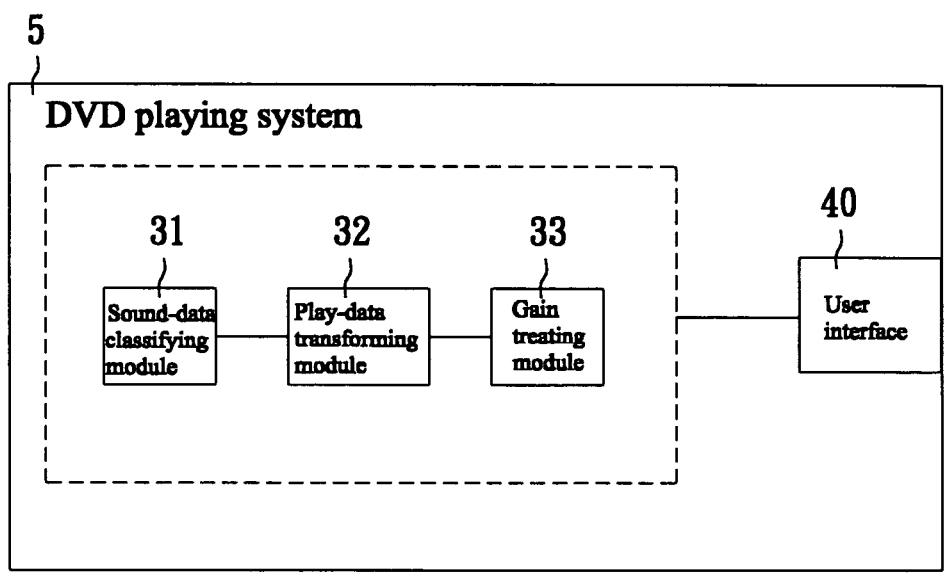
FIG. 5 is a schematic illustration showing a DVD playing system with a function of decreasing a broken noise in a fast-forward playing according to a preferred embodiment of the invention.

FIG. 5 shows a DVD playing system with a function of decreasing a broken noise in a fast-forward playing according to a preferred embodiment of the invention. In the embodiment, a DVD playing system 5 is, for example, a DVD player with a fast-forward playing function, and includes a user interface 40, a sound-data classifying module 31, a play-data transforming module 32, and a gain treating module 33.

The user interface 40 is provided for a user to choose a fast-forward playing function when the DVD playing system 5 plays. When the fast-forward playing function is chosen, the sound-data classifying module 31 classifies an inputted sound data into at least one first play data and at least one skip data, wherein the inputted sound data can be a two-channel sound data or a multi-channel sound data (as shown in FIG. 2A and FIG. 2B). The play-data transforming module 32 multiplies the first play data with a windowing function Wf(x), so the first play data is transformed into a second play data. The windowing function Wf(x) can be a Hanning windowing function, Hamming windowing function, or Blackman windowing function. The equation of Hanning windowing function $Wf(x)=\cos^2(\pi x/2)$, the equation of Hamming windowing function is $Wf(x)=0.54+0.46 \cos(\pi x)$, and the equation of Blackman windowing function is $Wf(x)=0.42+0.5 \cos(\pi x)+0.08 \cos(2\pi x)$, wherein the variable x is the first play data and the Wf(s) is the second play data. The gain treating module 33 multiplies the first play data with a first gain to obtain a first gain play data, multiplies the second play data with a second gain to obtain a second gain play data, and then adds the first gain play data and the second gain play data to generate a fast-forward data. In this case, the first gain g1 is smaller than the second gain g2, and the sum of the first gain g1 and the second gain g2 is less than or equal to 1. In the embodiment, the first gain is 0.2 and the second gain is 0.8.

In summary, since the first play data is multiplied with a windowing function and a gain treating is applied to modify the required play data, the processor (such as CPU or DSP) is unnecessary to decode all data. As a result, the hardware performance would not be mostly occupied, and the sound wave could become more continuous for preventing broken noise.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A sound fast-forward playing method, comprising:
   a sound-data classifying process, which classifies an inputted sound data into at least one first play data and at least one skip data;
   a play-data transforming process, which multiplies the first play data with a windowing function to generate a second play data; and
   a gain treating process, which multiplies the first play data with a first gain to generate a first gain play data, multiplies the second play data with a second gain to generate a second gain play data, and adds the first gain play data and the second gain play data to generate a fast-forward data.

2. The method according to claim 1, wherein the inputted sound data is a two-channel sound data or a multi-channel sound data.

3. The method according to claim 1, wherein the windowing function is a Hanning windowing function.

4. The method according to claim 1, wherein the windowing function is a Hamming windowing function.

5. The method according to claim 1, wherein the windowing function is a Blackman windowing function.

6. The method according claim 1, wherein the first gain is smaller than the second gain.

7. The method according claim 1, wherein the sum of the first gain and the second gain is smaller than or equal to 1.

8. A sound fast-forward device, comprising:
   a memory storing modules for execution by a processor, said modules including:
   a sound-data classifying module, which classifies an inputted sound data into at least one first play data and at least one skip data;
   a play-data transforming module, which multiplies the first play data with a windowing function to generate a second play data; and
   a gain treating module, which multiplies the first play data with a first gain to generate a first gain play data, multiplies the second play data with a second gain to generate a second gain play data, and adds the first gain play data and the second gain play data to generate a fast-forward data.

9. The device according to claim 8, wherein the inputted sound data is a two-channel sound data or a multi-channel sound data.

10. A DVD playing system with a function of decreasing a broken noise in a fast-forward playing, comprising:
    a memory storing modules for execution by a processor, said modules including:
    a sound-data classifying module, which classifies an inputted sound data into at least one first play data and at least one skip data in the fast-forward playing, wherein the sound data is a two-channel sound data or a multi-channel sound data;
    a play-data transforming module, which multiplies the first play data with a windowing function to generate a second play data;
    a gain treating module, which multiplies the first play data with a first gain to generate a first gain play data, multiplies the second play data with a second gain to generate a second gain play data, and adds the first gain play data and the second gain play data to generate a fast-forward data; and
    a user interface, which is provided for a user to choose the fast-forward playing.

* * * * *